United States Patent [19]  [11] 3,873,689
Frensch et al.  [45] Mar. 25, 1975

[54] EVAPORATION INHIBITING ADDITIVE FOR CONCENTRATED DISPERSIONS OF PLANT PROTECTION PRODUCTS

[75] Inventors: Heinz Frensch; Konrad Albrecht, both of Frankfurt, Main, Germany

[73] Assignee: Hoechst Aktiengesellschaft, Frankfurt, Main, Germany

[22] Filed: Feb. 5, 1973

[21] Appl. No.: 329,681

[30] Foreign Application Priority Data
Feb. 7, 1972  Germany............................ 2205590

[52] U.S. Cl.................... 424/78, 424/244, 424/287, 424/288, 424/314, 424/337, 424/352, 424/358, 424/170, 71/79, 71/DIG. 1
[51] Int. Cl............................................. A01n 9/00
[58] Field of Search .............. 424/168, 170, 358, 78

[56] References Cited
UNITED STATES PATENTS
| | | | |
|---|---|---|---|
| 2,765,255 | 10/1956 | Swarbrick | 424/170 |
| 2,898,267 | 8/1959 | Lindner | 424/170 |
| 3,285,201 | 11/1966 | Maxwell | 424/168 |

OTHER PUBLICATIONS
Chemical Abstracts, Vol. 72 (1970), p.120488y.
Chemical Abstracts, Vol. 73 p. 108611w.

*Primary Examiner*—Vincent D. Turner
*Attorney, Agent, or Firm*—Curtis, Morris & Safford

[57] ABSTRACT

Evaporation inhibiting additive for concentrated dispersions of plant protection products containing an aliphatic mineral oil, a defoamer, a non-ionic emulsifier and sodium oleylmethyltaurate and optionally an adhesive, a pigment and a polyalcohol.

6 Claims, No Drawings

EVAPORATION INHIBITING ADDITIVE FOR CONCENTRATED DISPERSIONS OF PLANT PROTECTION PRODUCTS

The present invention relates to an evaporation inhibiting additive for concentrated dispersions of plant protection products.

In accordance with the requirements of rationalization, spray liquors of plant protection products are spread from airplanes in small application amounts but in correspondingly elevated concentrations of active substance. Active substances in liquid form or dissolved in solvents are spread according to the so-called Ultra Low Volume (ULV) process in quantities of from 0.5 to 5 liters/ha, and fungicides, which require an especially good distribution on the plants, are spread according to the Low Volume (LV) process in quantities of from 5 to 15 liters/ha.

Commercial wettable powders and emulsifiable concentrates in water-insoluble organic solvents, which have proved their efficiency for a long time and which used to be sprayed in the form of aqueous suspensions at a rate of 300 to 600 liters of water per ha, are being applied more and more by means of airplanes according to the LV process.

However, as is easily seen, this procedure presents the following difficulties:

Wettable powders have been developed for application in a large amount of water, i.e., as already mentioned, in about 300 to 600 liters/ha. When the corresponding amounts of a wettable powder are to be dispersed in an application amount of no more than 15 liters of water per ha in order to be spread in accordance with the LV process, very often highly viscous suspensions are obtained or flocculation of the particles of the active substance and the carrier material occurs which result in choking of the nozzles.

In order to obtain a uniform coating of the plants with the plant protection product, the LV process requires a rather highly concentrated spray liquor to be spread in a much finer distribution than necessary with the conventional processes using a 30 to 60 times larger suspension amount. From this faction results the main handicap for a LV spreading of suspensions of active substances: On account of the large surface of the fine drops the water evaporates too rapidly; moreover, the spray liquor screen or the active substance spread is driven off by the wind too easily and relatively rapidly. The results are drift losses of active substance and- depending on the nature of the plant protective agent — also drift damages of adjacent crops. A precise dosage of the active substance thus is not possible, and the spray liquor deposits are not visible on the plants.

Moreover, when the spray liquor is introduced into the highly reduced amount of water, foam is forming to a very great extent, since the dispersing and wetting agents contained in the wettable powders are then present in a correspondingly higher concentration, to such a degree that the product foams out of the spray tanks unless the charge is strictly reduced.

It is already known that fatty alcohols and mineral oils, spread in a thin layer on water surfaces and soils, inhibit the evaporation of water. Furthermore, in the plant protection field, mineral oils are already used as so-called spray oils for combating fruit tree pests. However, these oils cannot be employed with spray liquors of a concentration as indicated above, since the oil in water absorbs the fine particles of active substance and carrier and precipitates them as flocculated sludge, so that the mixture cannot be used any more.

The present invention relates to evaporation inhibiting additives in the form of oil dispersions for concentrated dispersions of plant protection products, which additives contain

| | | |
|---|---|---|
| from 20 to 60 % | by weight of | an aliphatic mineral oil having a maximum content of 15 % by weight of aromatic substances (industrial grade), |
| from 1 to 5 % | do. | a defoamer, |
| from 0 to 5 % | do. | an adhesive, |
| from 0.5 to 5 % | do. | a nonionic emulsifier (H.L.B. 10–12) |
| from 0.5 to 2.5% | do. | sodium salt of oleylmethyltauride, |
| from 0 to 30 % | do. | a pigment, |
| from 0 to 40 % | do. | polyalcohol, and water for completion to 100 % by weight, at least 10 % by weight. |

These additives have an evaporation inhibiting activity and form very stable mixed dispersions, which can be easily sprayed, with concentrated liquors of wettable powders, for example of the active substances known by the following common names: fentin acetate, fentin hydroxide, fentin chloride, maneb, mancozeb, endosulfan, binapacryl, lindan, tetradifon, monuron, diuron, linuron, monolinuron, chlorotoluron, ioxynil, dinoseb acetate, furthermore mecoprop (MCPP) and 2,4,5-TB, and their corresponding salts, optionally also with addition of emulsifiable concentrates containing the active substances endosulfan or binapacryl for example. The additives of the present invention also permit the spreading of emulsifiable concentrates alone, which otherwise are physically unstable when applied in aqueous LV application concentrations, in the form of stable emulsions.

The commercial formulations of wettable powders and emulsifiable solutions being compatible with the additives of the invention contain those anion active and nonionic surfactants most commonly used in practice, which in said products are to have a wetting, dispersing or emulsifying effect, for example sodium or calcium salts of alkylbenzene sulfonates, sodium salts of substituted naphthalenesulfonic acids, sodium salts of sulfosuccinic acid esters, sodium salts of lingnin sulfonates, polyglycol esters or polyglycol ethers of substituted phenols, fatty acids, fatty alcohols or polyalcohols.

Surprisingly, the additives of the invention, in application amounts of from 0.5 to 2 liters in from 5 to 30 liters of spray liquors, have a strong evaporation inhibiting effect on the fine water droplets containing the plant protection product (see Table). This effect could not be expected, since the oil in this case is emulsified in water and does not cover a water surface as a thin layer. The additives of the invention also counteract the evaporation of volatile plant protection agents having a low boiling point and consequentially a high vapor pressure, thus providing a means for prolonging the protective effect of such agents. On account of the composition of the invention, a disturbing formation of foam is avoided, and the addition of a pigment makes possible the obtention of a well visible coating of the sprayed plants, which coating, for the control of the covering degree of the plant protection product often is not only desired, but prescribed. The additive of the invention also ensures a good adhesion of the coating, which resists for example the action of tropical downpours.

As mineral oils for these additives, such hydrocarbon fractions are advantageously used which have a low content — preferably less than 15 percent by weight — of aromatic substances, and which contain amounts of at least 85 percent by weight, preferably more than 90 percent, of residues which cannot be sulfonated. Such mineral oils are obtained as distillation products of crude oil work-up. They have at least 12 carbon atoms, a viscosity of from 3° to 5° Engler at 20°C, a boiling point of about 180°C and a distillation end-point of more than 400°C under normal pressure.

An nonionic emulsifiers, emulsifiers having a H.L.B. (hydrophilic-lipophilic balance) value of from 10 to 12 are used, in order attain attains a perfect balance of the lipophilic and the hydrophilic forces of the emulsifier system. For this purpose, alkylphenyl-polyalkoxy-alkanones, iso-octylphenylpolyglycol ethers, tri-isobutylphenyl-polyglycol ethers, oleyl-polyglycol ethers, fatty acid esters of sorbitan or polyoxy-ethylene derivatives of sorbitan esters of fatty acids may be used. Examples are the commercial products Emulsogen(R)M, Emulgator (R)G 1186 or Triton(R)X-207.

Suitable defoamers are tri-isobutyl phosphate and other trialkyl phosphates, furthermore all surfactants of similar activity which are compatible with the other components of the mixture and do not have any toxic action in crop plants, such as aliphatic hydrocarbon emulsions, for example "Silicon-Antischamemulsion SE2" of Wacker Chemie AG or "Nopco NXZ" of Nopco Munzing AG.

Adhesives suitable for the additives of the invention are all conventional adhesives for plant protection products which are used in wettable powders and emulsifiable concentrates. Preferably, a 55 percent aqueous polyvinyl acetate dispersion is employed, or also polyvinyl-pyrrolidone, polyacrylate, substituted sodium polyvinyl sulfonate, hydroxy-ethyl cellulose, carboxy-ethyl cellulose or gum kinds.

The pigments which are advantageously added to the mixture are preferably titanium dioxide or other inert white pigments having a grain diameter of from 3 to 5 microns, which show the desired marker effect; and they are used in amounts of from 10 to 25 percent by weight.

Polyalcohols suitable for the invention composition are generally water-soluble alcohols having more than one hydroxy group in the molecule, e.g. ethyleneglycol, glycerol, propylene glycol, water-soluble polyethylene glycols and polypropylene glycols.

The additives in accordance with the present invention contain preferably from 15 to 48 percent by weight of water, but these limits may also be exceeded in both directions.

The following examples illustrate the invention.

EXAMPLE 1

An additive in accordance with the invention for LV plant protection agents contains the following substances in the form of a stable oil dispersion obtained by mixing the components:

| | | |
|---|---|---|
| 35.0 % | by weight of | mineral white oil |
| 2.0 % | do. | oleyl alcohol polyglycol ether |
| 1.5 % | do. | sodium salt of oleylmethyltauride |
| 10.0 % | do. | titanium dioxide |
| 5.0 % | do. | a 55% polyvinyl acetate dispersion |
| 3.0 % | do. | tri-isobutyl phosphate |
| 43.5 % | do. | water |
| 100 % | by weight | |

EXAMPLE 2

In analogy to Example 1, the following additive is prepared by mixing the single components:

| | | |
|---|---|---|
| 40.0 % | by weight of | mineral white oil |
| 2.0 % | do. | sorbitoleate polyglycol ether |
| 2.0 % | do. | sodium salt of oleylmethyltauride |
| 13.0 % | do. | titanium dioxide |
| 3.0 % | do. | a 55% polyvinyl acetate dispersion |
| 4.0 % | do. | tri-isobutyl phosphate |
| 36.0 % | do. | water |
| 100 % | by weight | |

EXAMPLE 3

In analogy to Examples 1 and 2, the following mixture without adhesive is prepared:

| | | |
|---|---|---|
| 35.0 % | by weight of | mineral white oil |
| 4.0 % | do. | alkylphenol polyglycol ether |
| 1.5 % | do. | sodium salt of oleylmethyltauride |
| 15.0 % | do. | titanium dioxide |
| 2.0 % | do. | tri-isobutyl phosphate |
| 42.5 % | do. | water |
| 100 % | by weight | |

EXAMPLE 4

In analogy to Example 1, the following mixture is prepared:

| | | |
|---|---|---|
| 20.0 % | by weight of | mineral white oil |
| 25.0 % | do. | ethylene glycol |
| 2.0 % | do. | alkylphenol polyglycol ether |
| 1.5 % | do. | sodium salt of oleylmethyltauride |
| 3.0 % | by weight of | tri-isobutyl phosphate |
| 3.0 % | do. | a 55% polyvinyl acetate dispersion |
| 30.0 % | do. | barium sulfate |
| 15.5 % | do. | water |
| 100 % | by weight | |

EXAMPLE 5

In order to test the evaporation inhibition, a. 6 g of a wettable powder containing 60 percent by weight of fentin acetate (industrial grade; commercial product Brestan (R)conc.) wettable powder are suspended in 100 g of water, which corresponds to an application amount of 0.6kg per 10 liters of water/ha;

b. 6 g each of the above fentin acetate wettable powder are c.

d. dispersed in 100 g of water, but with addition of 10 g each of the additives of Examples 1 to 3 (corresponding to an application amount of 1 kg/ha);

e. 10 g of the additive of Example 2 alone are dispersed in 100 g of water.

These dispersions contain the following amounts of water:

| a) | 100.00 g | of water in | 106 g. | corresponding to | 94.5 % | by weight |
|---|---|---|---|---|---|---|
| b) | 104.35 g | do. | 116 g, | do. | 90.25% | do. |
| c) | 103.60 g | do. | 116 g, | do. | 89.50% | do. |
| d) | 104.25 g | do. | 116 g, | do. | 90.10% | do. |
| e) | 103.60 g | do. | 110 g, | do. | 94.40% | do. | when 200 mg each of the mixtures in the form of 12 fine droplets each were placed on an object-glass and the decrease of water at 22°C is determined, the evaporation rates listed in the following Table were obtained. The loss of water is indicated in mg. The percentage by weight of the water amount which was contained in the 200 mg of mixture and which is evaporated is indicated in brackets.

| | | minutes | | | | | | | | | | | |
|---|---|---|---|---|---|---|---|---|---|---|---|---|---|
| | | 5 | | 10 | | 15 | | 20 | | 25 | | 30 | |
| Dispersion | mg H₂O in 200 mg | Loss of water | | Loss of water | | Loss of water | | Loss of water | | Loss of water | | Loss of water | |
| | | mg | % by weight | mg | % by weight | mg | % by weight | mg | % by weight | mg | % by weight | mg | % by weight |
| a | 189 | 37.8 | (20) | 79.5 | (42) | 112 | (59) | 144 | (76.5) | 166 | (88) | 176 | (93) |
| b | 180.5 | 18 | (10) | 39.8 | (22) | 63.4 | (35) | 83.2 | (46) | 105 | (58) | 117.5 | (65) |
| c | 179 | 21.5 | (12) | 41.2 | (23) | 61 | (34) | 80.7 | (45) | 99.5 | (55.5) | 113 | (63) |
| d | 180.2 | 21.6 | (12) | 47 | (26) | 72.2 | (40) | 90.3 | (50) | 106.5 | (59) | 115 | (64) |
| e | 188.8 | 28.2 | (14.9) | 56.3 | (29.8) | 85 | (45) | 109.5 | (58) | 132 | (70) | 152.5 | (81) |

This table shows clearly the evaporation-inhibiting effect of the additives in comparison to Sample a containing no such additive, which effect is even superior to that of Control Sample e containing no plant protection agent in the form of a powder.

There is no foam formation in Samples b, c and d containing the additives of the invention, or the foam collapses at once, while it remains stable for hours on Sample a containing no additive.

Dispersions b, c and d of plant protection products, in comparison to Control Sample a yield clearly visible spray coatings.

During an LV airplane spreading of fentin acetate spray liquors of the above high concentration by means of usual Mikronair$^{(R)}$ nozzles, the test results as above were confirmed also by practical application. Well visible and uniformly distributed coatings were obtained. On the other hand, active substances containing no additive drifted off at 35°C.

What is claimed is:

1. An evaporation inhibiting additive for concentrated dispersions of plant protection products which comprises:

from 20 to 60 percent by weight of an industrial grade aliphatic hydrocarbon mineral oil having at least twelve carbon atoms, a maximum content of 15 percent by weight of aromatic compounds, at least 85 percent residues which cannot be sulfonated, a viscosity of 3° to 5° Engler at 20°C, and a distillation end-point of more than 400°C under normal pressure, from 1 to 5 percent by weight of tri-isobutyl phosphate defoamer, from 0 to 5 percent by weight of 55 percent aqueous polyvinyl acetate dispersion adhesive, from 0.5 to 5 percent by weight of a nonionic emulsifier selected from the group consisting of an alkylphenyl-polyalkoxyalkanone, an iso-octyphenyl-polyglycol ether, a tri-isobutylphenyl-polyglycol ether, an oleyl-polyglycol ether, a fatty acid ester of sorbitan and a polyoxy-ethylene derivative of sorbitan esters of fatty acids, said emulsifier having a hydrophilic-lipophilic balance value of from 10 to 12, from 0.5 to 2.5 percent by weight of sodium salt of oleyl-methyltauride, from 0 to 30 percent by weight titanium dioxide pigment, from 0 to 40 percent by weight of a water soluble polyalcohol and at least 10 percent by weight water.

2. The evaporation inhibiting additive of claim 1, wherein said mineral oil has at least 90 percent, residues which cannot be sulfonated and has a boiling point of about 180°C under normal pressure.

3. The evaporation inhibiting additive of claim 1 which contains from 10 to 25 percent by weight titanium dioxide powder pigment having a grain diameter of less than 3 to 5 microns.

4. The evaporation inhibiting additive of claim 1 which contains water in amounts of from 15 to 48 percent by weight.

5. The evaporation inhibiting additive of claim 1 which contains from 10 to 40 percent by weight of the water soluble polyalcohol.

6. A method of inhibiting the evaporation of water from concentrated aqueous dispersions of plant protection product spray liquors while spraying said liquors using the low volume or ultra low volume spray procedure which comprises adding from 0.5 to 2.0 liters of an evaporation inhibiting additive composition consisting essentially of the composition of claim 1 to an amount of 5 to 30 liters of said concentrated spray liquor and spraying the concentrated liquor on the plants to be protected at a rate of 0.5 to 5 or 5 to 15 liters/ha.

* * * * *